United States Patent
Jain

(10) Patent No.: US 8,089,788 B2
(45) Date of Patent: Jan. 3, 2012

(54) SWITCHED CAPACITOR VOLTAGE REGULATOR HAVING MULTIPLE CONVERSION RATIOS

(75) Inventor: Rinkle Jain, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 597 days.

(21) Appl. No.: 12/242,584

(22) Filed: Sep. 30, 2008

(65) Prior Publication Data

US 2010/0080023 A1   Apr. 1, 2010

(51) Int. Cl.
*H02J 1/10* (2006.01)
*H02M 3/18* (2006.01)
*H02M 7/00* (2006.01)
*H02M 3/06* (2006.01)

(52) U.S. Cl. ............... 363/65; 307/110; 363/60; 363/62
(58) Field of Classification Search .................. 307/110; 363/59–62
See application file for complete search history.

(56) References Cited

U.S. PATENT DOCUMENTS

| | | | | |
|---|---|---|---|---|
| 5,581,454 A * | 12/1996 | Collins | ........................... | 363/59 |
| 6,411,531 B1 * | 6/2002 | Nork et al. | ...................... | 363/60 |
| 6,920,055 B1 * | 7/2005 | Zeng et al. | ...................... | 363/59 |
| 7,844,233 B2 * | 11/2010 | Vaisanen | .................... | 455/127.1 |
| 2006/0044854 A1 * | 3/2006 | Bocchiola et al. | ............. | 363/86 |

* cited by examiner

*Primary Examiner* — Jeffrey Sterrett
*Assistant Examiner* — Gary Nash
(74) *Attorney, Agent, or Firm* — Ryder, Lu, Mazzeo and Konieczny, LLC; Douglas J. Ryder

(57) ABSTRACT

In general, in one aspect, the disclosure describes a switched capacitor voltage regulator to generate a regulated output voltage based on varying input voltages. The regulator is capable of operating at one of a plurality of voltage conversion ratios and selection of the one of a plurality of voltage conversion ratios is based on an input voltage received. The switched capacitor voltage regulator provides a lossless (or substantially lossless) voltage conversion at the selected ratio. The ratio selected provides a down converted voltage closest to the regulated output voltage without going below the regulated output voltage. The down converted voltage is adjusted to the regulated output voltage using a resistive mechanism to dissipate excess power (lossy). Selection of an appropriate conversion ratio limits the resistive regulation and losses associated therewith and increases the efficiency of the switched capacitor voltage regulator.

13 Claims, 4 Drawing Sheets

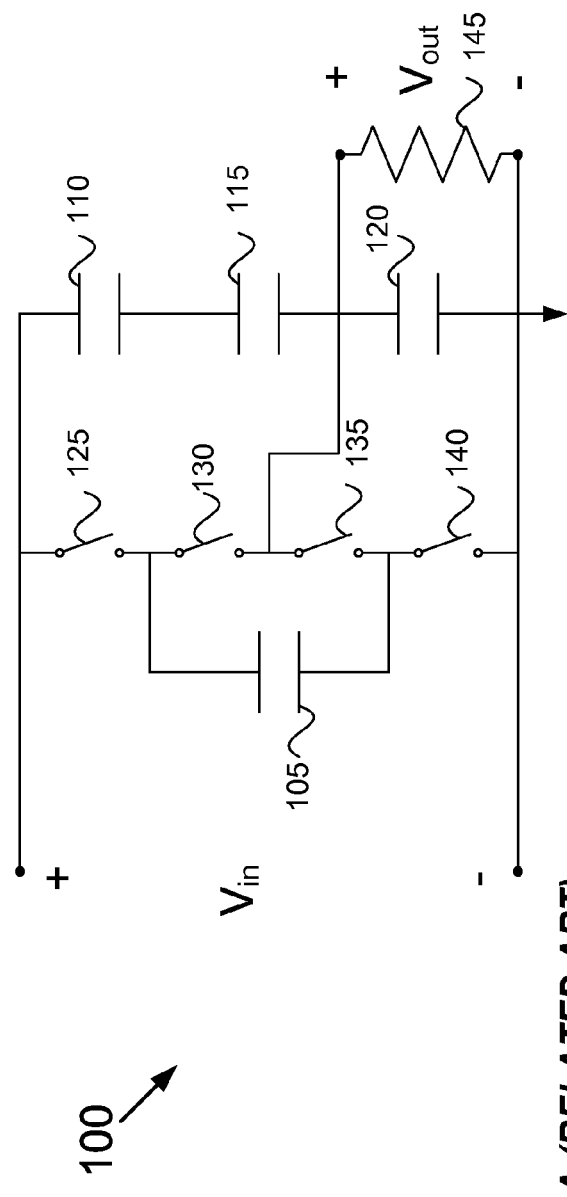
*FIG. 1A (RELATED ART)*
*FIG. 1B (RELATED ART)*
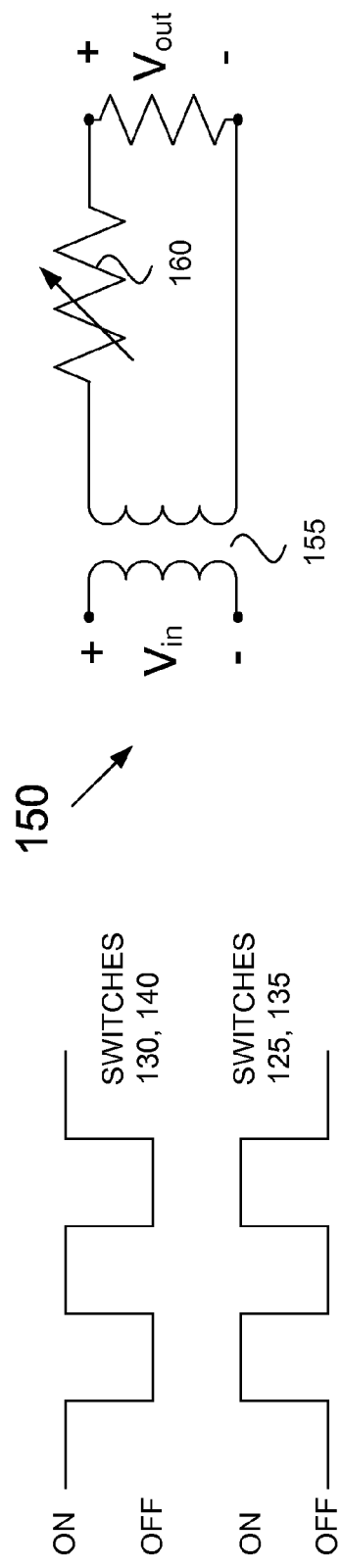
*FIG. 1C (RELATED ART)*

US 8,089,788 B2

SWITCHED CAPACITOR VOLTAGE REGULATOR HAVING MULTIPLE CONVERSION RATIOS

BACKGROUND

Point of load voltage regulators (VRs) are used to supply microprocessor loads. The microprocessors may have multiple loads (multiple operating voltages). The VRs are step down power converters (e.g., buck converters) that step down the system voltage to the voltage required by the microprocessor load. Systems today often utilize multi-core processors that require individual VRs per core for maximum performance per watt. This has caused a proliferation in the number of VRs used in microprocessor based systems. Therefore, miniaturization of the VRs and proximity to the load are essential to meet area constraints in these systems.

Fabricating the voltage regulators on silicon enables the VR to be miniaturized in close proximity to the load. However, the efficiency range of an on-die buck converter is relatively low (e.g., 77-83%). Furthermore, the buck converters require inductors which call for special additional stages in the silicon fabrication process like sputtering thereby increasing the cost.

BRIEF DESCRIPTION OF THE DRAWINGS

The features and advantages of the various embodiments will become apparent from the following detailed description in which:

FIG. 1A illustrates an example switched capacitor circuit providing a 2:1 transformation of an input voltage;

FIG. 1B illustrates an example timing diagram of the operation of the switch pairs in the switched capacitor circuit of FIG. 1A;

FIG. 1C illustrates an example equivalent circuit of the switched capacitor circuit of FIG. 1A;

DETAILED DESCRIPTION

Figure 2A:
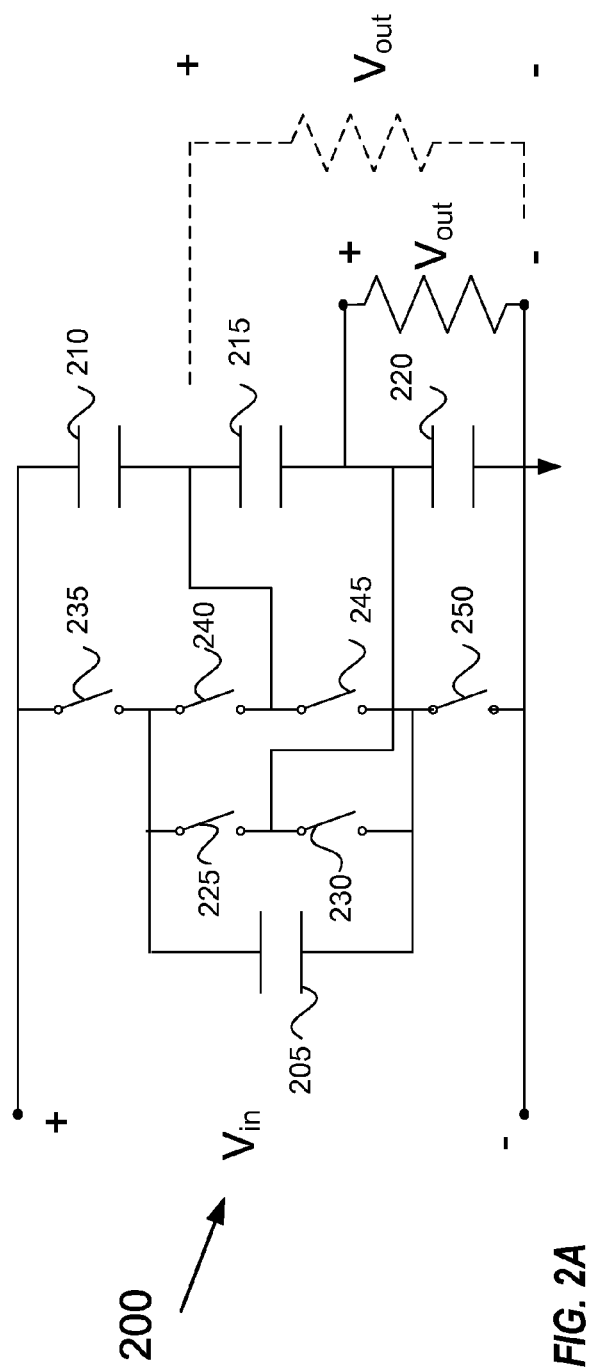
FIG. 2A illustrates an example switched capacitor circuit that may be utilized to provide several transformation modes, according to one embodiment.

Switched capacitor circuits can be utilized as step down power converters. The switched capacitor circuits provide a lossless (or substantially lossless) voltage conversion at a ratio that is characteristic of the circuit topology. A resistive mechanism can be used to regulate its output voltage at a level lower than the converted level. The regulation mechanism is resistive similar to a linear regulator where voltage regulation is achieved by dissipating the excess power (lossy).

FIG. 1A illustrates an example switched capacitor circuit 100 providing a 2:1 transformation (voltage conversion ratio) of an input voltage (provides output that is ½ of input). The circuit 100 may include four capacitors 105, 110, 115, 120, and four switches 125, 130, 135, 140. The switches may be one or more transistors. The capacitors 110, 115, 120 are connected in series. The input voltage ($V_{in}$) is provided across the three series connected capacitors 110, 115, 120. The capacitor 105 (flying capacitor) is connected in parallel to one or more of the capacitors 110, 115, and 120 respectively based on the operation of the switches 125, 130, 135, 140. When the switches 125, 135 are closed and the switches 130, 140 are open the capacitor 105 is connected in parallel with capacitors 110, 115 and when switches 130, 140 are closed and the switches 125, 135 are open the capacitor 105 is in parallel to the capacitor 120. The pairs of switches 125/135, 130/140 are switched on and off alternatively at a constant frequency.

FIG. 1B illustrates an example timing diagram of the operation of the switch pairs for the switched capacitor circuit 100 to provide a 2:1 voltage conversion ratio. The switch pair 125/135 is on while the switch pair 130/140 is off and vice versa. The on cycle is approximately half of the duty cycle for each pair of switches. It should be noted that the signals are illustrated as on and off signals for ease of illustration. These signals may equate to voltages that are applied to transistors in order to have the transistor act as an open or closed switch respectively. The voltages applied to turn a switch on may be high while the voltage applied to turn the switch off may be low or could be the opposite. The level of the high and low voltages may be dependent on the implementation.

Referring back to FIG. 1A, the voltage output ($V_{out}$) is measured across capacitor 120. This $V_{out}$ is provided across the load (e.g., microprocessor). The resistance of the load ($R_L$) 145 determines the current flowing through the load. The circuit 100 may provide a lossless (or substantially lossless) 2 to 1 voltage conversion ratio.

FIG. 1C illustrates an example equivalent circuit 150. The equivalent circuit 150 may provide closed loop voltage regulation and include a transformer 155 and a variable resistor 160. The transformer 155 may step down $V_{in}$ by a factor of 2 so that the downshifted voltage is half of $V_{in}$, $V_{down}=V_{in}/2$. The 2:1 voltage conversion ratio may be lossless (or substantially lossless). The variable resistor 160 may provide regulation of $V_{out}$ (further adjust the $V_{down}$ down by dissipating the excess power). The regulation of $V_{out}$ is lossy and accordingly affects the efficiency of the overall down-conversion.

Accordingly, the switched capacitor circuit 100 may be used for stepping up or down voltages at very high efficiencies where line regulation is not a criterion. The switched capacitor circuit 100 may be utilized as a voltage regulator (VR) for low power applications. However, the switched capacitor circuit 100 may not suitable to generate a regulated output voltage for medium or high power applications especially with a wide range of input voltages due to the lossy regulation mechanism (resistance).

FIG. 2A illustrates an example switched capacitor circuit 200 that may be utilized to provide several transformation modes. The circuit 200 may include four capacitors 205, 210, 215, 220, and six switches 225, 230, 235, 240, 245, 250. The switches may be one or more transistors. The capacitors 210, 215, 220 are connected in series and the input voltage ($V_{in}$) is provided across these three series connected capacitors 210, 215, 220. The capacitor 205 (flying capacitor) is connected in parallel to one of the capacitors 210, 215, and 220 respectively based on the operation of the switches 225, 230, 235, 240, 245, 250. When the switches 235, 245 are closed and the other switches are open the capacitor 205 is connected in parallel with the capacitor 210. When switches 230, 240 are closed and the other switches are open the capacitor 205 is connected in parallel to the capacitor 215. When switches 225, 250 are closed and the other switches are open the capacitor 205 is connected in parallel to the capacitor 220. The pairs of switches 235/245, 230/240, 225/250 are switched on and off alternatively at constant frequencies. The voltage output ($V_{out}$) is the voltage stored in the capacitor 220. This $V_{out}$ is provided to the load (e.g., microprocessor). The circuit 200 may provide a lossless (or substantially lossless) 3 to 1 voltage conversion ratio ($V_{down}=V_{in}/3$).

Figure 2B:
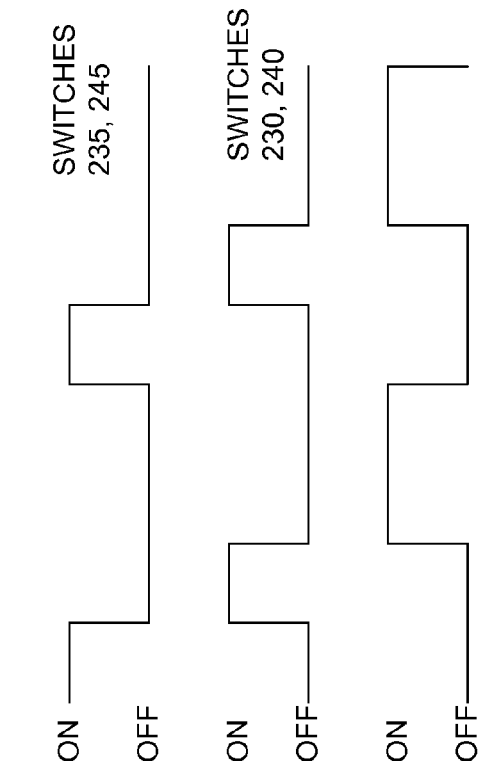
FIG. 2B illustrates an example timing diagram of the operation of the switch pairs in the switched capacitor circuit to provide a 3:1 transformation, according to one embodiment.

FIG. 2B illustrates an example timing diagram of the operation of the switch pairs in the switched capacitor circuit 200 to provide a 3:1 voltage conversion ratio. The switch pair 235/245 is on for approximately 25% duty cycle, followed by the switch pair 230/240 that is on for approximately 25% duty cycle, followed by the switch pair 225/250 that is on for approximately 50% duty cycle.

Referring back to FIG. 2A, the circuit 200 can be converted from a 3:1 voltage conversion ratio to a 3:2 voltage conversion ratio ($V_{down}=2V_{in}/3$) by reconfiguring the placement of the load (where $V_{out}$ is provided from). If the load was configured to be across the capacitors 215, 220 the $V_{out}$ would be the voltage stored in the capacitors 215, 220. The 3:2 voltage conversion ratio may be provided using the same switching cycles defined with respect to the 3:1 voltage conversion ratio (FIG. 2B). While not illustrated the load may be switched from being in parallel with capacitor 220 to being in parallel to the capacitors 215, 220 by utilizing some type of switching mechanism.

The circuit 200 may also be used to provide a 2:1 voltage conversion ratio ($V_{down}=V_{in}/2$) if the switches 240 and 245 are deactivated (remain open) and the switch pairs 230/235 and 225/250 are switched on and off alternatively at a constant frequency (e.g., as described with respect to FIG. 1B).

The circuit 200 may be switched between the various modes (voltage conversion ratios) described above. The switching between modes may be based on what $V_{in}$ is received and what $V_{out}$ is desired. Since the conversion ratio is lossless (or substantially lossless) selecting an appropriate mode dependent of $V_{in}$ enables the resistive regulation (lossy) to be minimized. The appropriate mode selected would provide $V_{down}$ closest to the desired $V_{out}$, without going below the desired regulated $V_{out}$. For example, if the desired $V_{out}$ was 2V and the $V_{in}$ could range from 3V-8V, the appropriate mode to select may be: (1) 3:2 for $V_{in}$ from 3-4V to provide $V_{down}$ from 2-2.67V, (2) 2:1 for $V_{in}$ from 4-6V to provide $V_{down}$ from 2-3V, and (3) 3:1 for $V_{in}$ from 6-8V to provide $V_{down}$ from 2-2.67V.

Utilizing a fixed voltage conversion ratio switched capacitor circuit would either be inefficient because it relied heavily on the lossy resistance mechanism to regulate $V_{out}$ or would not be able to provide the necessary $V_{out}$ for certain $V_{in}$ regions. In the above noted example, the 2:1 voltage conversion ratio for $V_{in}$ over 6V (e.g., 8V) would result in $V_{down}$ (e.g., 4V) that still required substantial reduction/regulation (e.g., from 4V to 2V) be provided by the resistive regulation mechanism (lossy) which would result in an inefficient regulation. The 3:1 voltage conversion ratio for $V_{in}$ less than 6V (e.g., 4.5V) would result in $V_{down}$ (e.g., 1.5V) below the desired $V_{out}$.

Figure 2C:
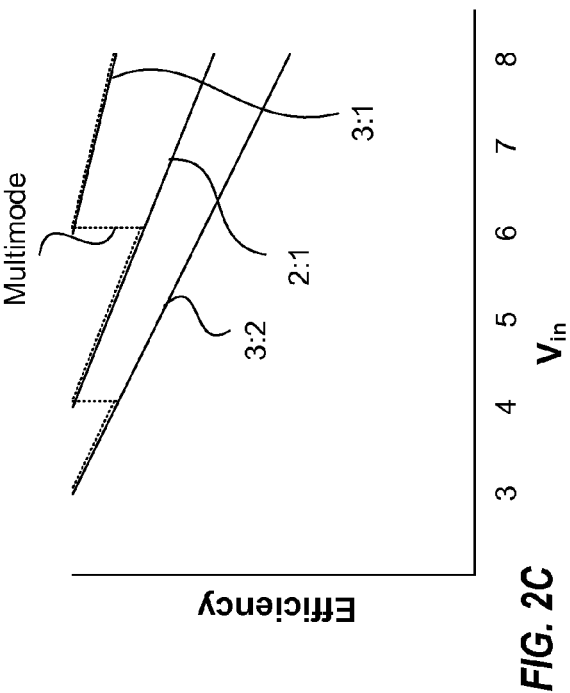
FIG. 2C illustrates a graph of an example regulation efficiency for the multi-mode switched capacitor circuit of FIG. 2A, according to one embodiment.

FIG. 2C illustrates a graph of an example voltage regulation efficiency for the multi-mode switched capacitor circuit 200 for the above noted examples. The 3:2 voltage conversion ratio (mode) may provide approximately 100% efficiency for $V_{in}=3V$ since $V_{down}$ generated is the desired $V_{out}$ ($V_{down}=V_{out}=2V$) and then the efficiency falls from there as $V_{in}$ increases and resistive regulation (lossy) is required. The 2:1 mode may not be used for $V_{in}<4V$ since it would produce $V_{down}<2V$ ($V_{out}$). For $V_{in}=4V$ it may provide 100% efficiency ($V_{down}=V_{out}$), with the efficiency falling as $V_{in}$ increases. The 3:1 mode may not be used for $V_{in}<6V$ since it would produce $V_{down}<2V$. For $V_{in}=6V$ it may provide approximately 100% efficiency ($V_{down}=V_{out}$), with the efficiency falling as $V_{in}$ increases.

Selecting the appropriate mode based on $V_{in}$ may enable the circuit 200 to be used over the entire range of $V_{in}$ with an efficiency that is approximately 100% at several points and never falls too far. The mode that the circuit 200 is operated in may be controlled by the signals provided thereto (e.g., the switching signals for switches 225-250, the signals that control where the load is connected). A controller (not illustrated) may be utilized to detect $V_{in}$ and select the appropriate mode. The controller may provide the appropriate switch signals or may control the switching signals that are provided (e.g., gate other signals).

Additional voltage conversion ratios may be obtained by utilizing a plurality of switched capacitor circuits (e.g., 200) connected together. The circuits can be utilized as the basic building blocks with the blocks being connected in series. The adjacent blocks may have one or two of the series connected capacitors overlapping. To utilize blocks at a 2:1 conversion rate the blocks may only overlap one capacitor. The voltage conversion ratios (modes) of the individual blocks may be selected separate from each other to provide additional voltage conversion ratios (e.g., the mode for each of the blocks need not be the same).

Figure 3:
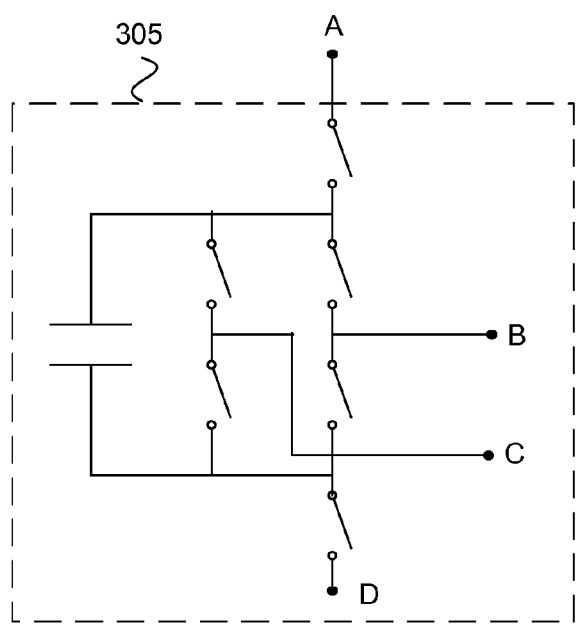
FIG. 3 illustrates an example switched capacitor circuit that includes two switched capacitor circuits (blocks) having a single capacitor overlap, according to one embodiment.
Figure 3:
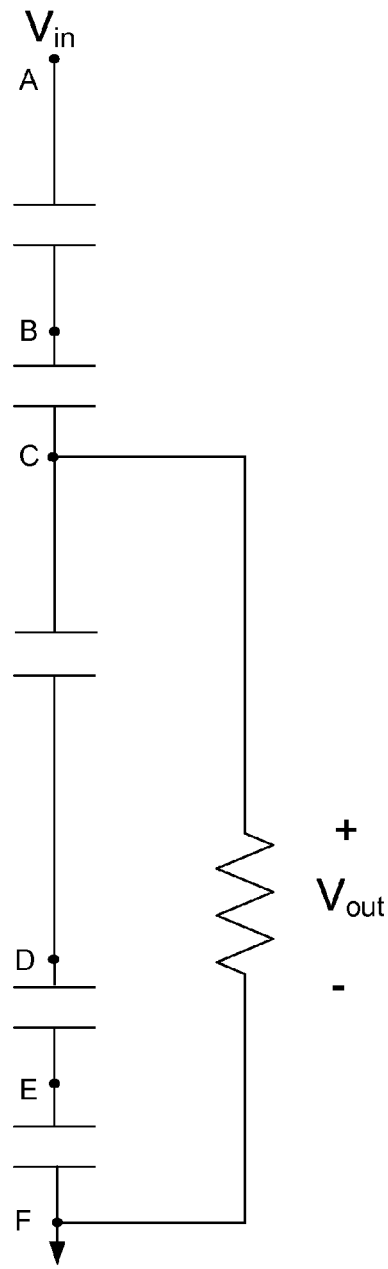

FIG. 3 illustrates an example switched capacitor circuit 300 that includes two switched capacitor circuits (blocks) 305, 310 having a single capacitor overlap. The five series connected capacitors are illustrated outside of each of the blocks for ease of illustration. Each node on the right is connected to the corresponding node on the left. The blocks 305, 310 each have nodes C and D to reflect the fact that the middle capacitor is overlapped between the blocks 305, 310. $V_{in}$ is provided at point A and ground is provided at point F. $V_{out}$ is measured across the lower three capacitors.

Using this arrangement and operating the blocks in either 2:1 or 3:1 conversation mode (assuming no rearranging of the load as required for 3:2 conversion) may result in four different voltage conversion ratios. For example, if block 305 is operating in 2:1 mode and block 310 is operating in 3:1 mode the circuit 300 may provide a transformation ration of 4:3 ($V_{down}=75\%$ Vin). If both blocks 305, 310 are operating in 2:1 mode the overall transformation ratio may be 3:2 ($V_{down}=66\%$ Vin). If both blocks 305, 310 are operating in 3:1 mode the overall transformation ratio may be 5:3 ($V_{down}=60\%$ Vin). If block 305 is operating in 3:1 mode and block 310 is operating in 2:1 mode the circuit 300 may provide a transformation ration of 2:1 ($V_{down}=50\%$ Vin).

The circuit 300 may select an appropriate overall voltage conversion ratio based on the input voltage received and the mode selected for each of the blocks may be based thereon. For example, if a determination was made that the appropriate voltage conversion ratio for the circuit 300 to operate at was 4:3, the first block 305 would operate in 2:1 mode and the second block 310 would operate in 3:1 mode.

Figure 4:
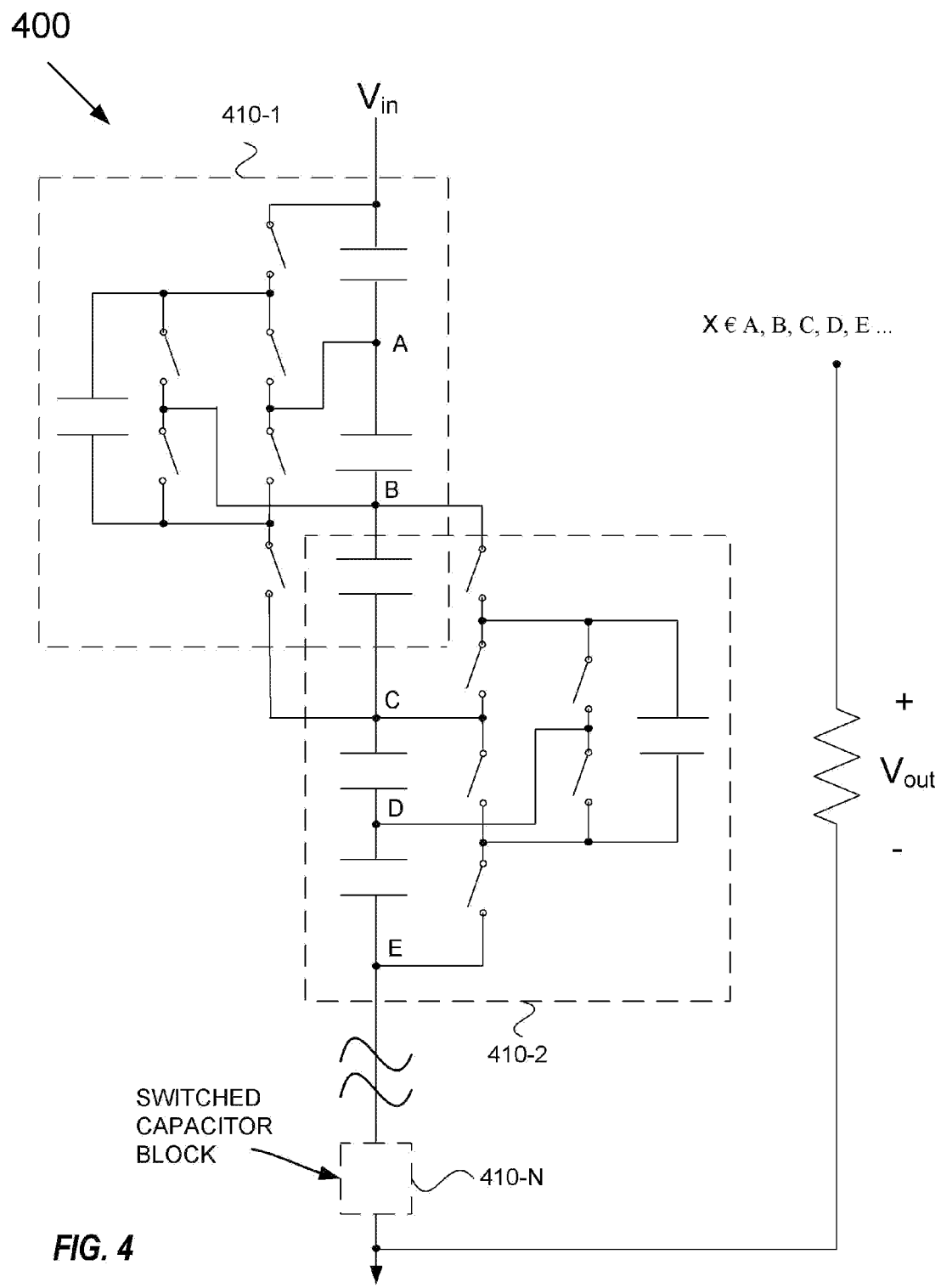
FIG. 4 illustrates an example configuration of a switched capacitor circuit with a plurality of blocks, according to one embodiment.

FIG. 4 illustrates an example configuration of a switched capacitor circuit 400 with a plurality of blocks 410 (410-1, 410-2 ... 410-N) where successive blocks share a capacitor. For ease of illustration only the contents of successive blocks 410-1 and 410-2 are illustrated and block 410-N is included simply to illustrate that up to N blocks could be included in circuit 400. As illustrated, the blocks 410-1 and 410-2 have one capacitor overlap. If each of the successive blocks (e.g., 410-1 and 410-2) were not going to be operated in a 2:1 configuration then there may be a 2 capacitor overlap. The load may be provided between ground and any of the nodes between capacitors (illustrated as being connected to X which can be any of the nodes from node A on). The overall voltage conversion ratio provided depends on the number of blocks, the mode each block is operated at and the placement of the load.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A switched capacitor voltage regulator to generate a regulated output voltage based on varying input voltages, wherein the regulator is capable of operating at one of a plurality of voltage conversion ratios and selection of the one of a plurality of voltage conversion ratios is based on an input voltage received, the switched capacitor voltage regulator comprising three series connected capacitors to receive the input voltage, a flying capacitor, and three pairs of switches used to connect the flying capacitor to various subsets of the three series connected capacitors.

2. The regulator of claim 1, wherein the one of a plurality of voltage conversion ratios provides a down converted voltage closest to the regulated output voltage without going below the regulated output voltage.

3. The regulator of claim 2, wherein the down converted voltage is adjusted to the regulated output voltage using a resistive mechanism to dissipate excess power.

4. The regulator of claim 1, wherein placement of load is used to select the one of a plurality of voltage conversion ratios.

5. A switched capacitor voltage regulator to generate a regulated output voltage based on varying input voltages, wherein the regulator is capable of operating at one of a plurality of voltage conversion ratios and selection of the one of a plurality of voltage conversion ratios is based on an input voltage received, the switched capacitor voltage regulator comprising a plurality of capacitors and a plurality of switches, wherein placement of load is used to select the one of a plurality of voltage conversion ratios.

6. The regulator of claim 5, wherein operation of the switches is used to select the one of a plurality of voltage conversion ratios.

7. The regulator of claim 5, wherein the plurality of capacitors and the plurality of switches create a plurality of switched capacitor blocks connected in series, wherein each block is capable of operating in one of a plurality of modes, and wherein selection of the one of a plurality of modes for each of the circuits is based on the one of a plurality of voltage conversion ratios selected.

8. An apparatus to receive an input voltage and generate a regulated output voltage, wherein the apparatus comprises a plurality of switched capacitor blocks connected in series, wherein each block is capable of operating in one of a plurality of modes, wherein combinations of modes between the plurality of switched capacitor blocks provides a plurality of voltage conversion ratios, wherein one of the plurality of voltage conversion ratios is selected based on the input voltage received, and wherein the one of a plurality of modes selected for each circuit is based on the one of the plurality of voltage conversion ratios selected.

9. The apparatus of claim 8, wherein the second ratio selected provides a down converted voltage closest to the regulated output voltage without going below the regulated output voltage.

10. The apparatus of claim 9, wherein the down converted voltage is adjusted to the regulated output voltage using a resistive mechanism to dissipate excess power.

11. The apparatus of claim 8, wherein placement of load is used to select the one of a plurality of voltage conversion ratios.

12. The apparatus of claim 8, wherein each block includes three series connected capacitors to receive the input voltage, a flying capacitor, and three pairs of switches used to connect the flying capacitor to various subsets of the three series connected capacitors.

13. The apparatus of claim 12, wherein adjacent blocks share one or two of the three series connected capacitors.

* * * * *